(12) United States Patent
Cheng et al.

(10) Patent No.: US 10,513,769 B2
(45) Date of Patent: Dec. 24, 2019

(54) TANTALUM POWDER AND PROCESS FOR PREPARING THE SAME, AND SINTERED ANODE PREPARED FROM THE TANTALUM POWDER

(71) Applicant: NINGXIA ORIENT TANTALUM INDUSTRY CO., LTD., Ningxia (CN)

(72) Inventors: Yuewei Cheng, Ningxia (CN); Fukun Lin, Ningxia (CN); Xueqing Zhang, Ningxia (CN); Guoqing Luo, Ningxia (CN); Haiyan Ma, Ningxia (CN); Yinghui Ma, Ningxia (CN); Yanjie Wang, Ningxia (CN); Xuanyu Wang, Ningxia (CN); Dongjie Zhang, Ningxia (CN)

(73) Assignee: NINGXIA ORIENT TANTALUM INDUSTRY CO., LTD., Shizuishan (CN)

( * ) Notice: Subject to any disclaimer, the term of this patent is extended or adjusted under 35 U.S.C. 154(b) by 0 days.

(21) Appl. No.: 15/125,803

(22) PCT Filed: Nov. 3, 2014

(86) PCT No.: PCT/CN2014/090151
§ 371 (c)(1),
(2) Date: Sep. 13, 2016

(87) PCT Pub. No.: WO2016/070303
PCT Pub. Date: May 12, 2016

(65) Prior Publication Data
US 2017/0226616 A1   Aug. 10, 2017

(51) Int. Cl.
| | |
|---|---|
| *C22F 1/18* | (2006.01) |
| *B22F 9/20* | (2006.01) |
| *B22F 1/00* | (2006.01) |
| *H01G 9/052* | (2006.01) |
| *B22F 3/10* | (2006.01) |
| *B22F 5/00* | (2006.01) |
| *B22F 9/24* | (2006.01) |
| *C21D 3/02* | (2006.01) |
| *H01G 9/00* | (2006.01) |
| *H01G 9/042* | (2006.01) |
| *H01G 9/04* | (2006.01) |

(52) U.S. Cl.
CPC ............ *C22F 1/18* (2013.01); *B22F 1/0003* (2013.01); *B22F 1/0014* (2013.01); *B22F 3/10* (2013.01); *B22F 5/00* (2013.01); *B22F 9/20* (2013.01); *B22F 9/24* (2013.01); *C21D 3/02* (2013.01); *H01G 9/0029* (2013.01); *H01G 9/042* (2013.01); *H01G 9/0525* (2013.01); *B22F 2009/245* (2013.01); *B22F 2201/20* (2013.01); *B22F 2301/20* (2013.01); *B22F 2998/10* (2013.01); *H01G 9/052* (2013.01); *H01G 2009/05* (2013.01)

(58) Field of Classification Search
CPC ...... B22F 1/0003; C22F 1/18; H01G 2009/05
USPC ........................................................ 75/622
See application file for complete search history.

(56) References Cited

U.S. PATENT DOCUMENTS

| | | | |
|---|---|---|---|
| 6,193,779 B1 * | 2/2001 | Reichert ............... | B22F 9/20 |
| | | | 75/245 |
| 6,238,456 B1 | 5/2001 | Wolf et al. | |
| 7,679,885 B2 * | 3/2010 | Mizusaki ............. | B22F 1/0018 |
| | | | 361/508 |
| 2006/0070492 A1 * | 4/2006 | Qiu ...................... | B22F 1/0014 |
| | | | 75/255 |
| 2009/0180240 A1 | 7/2009 | Li et al. | |
| 2010/0326239 A1 | 12/2010 | Shi et al. | |

FOREIGN PATENT DOCUMENTS

| | | |
|---|---|---|
| CN | 1197707 | 11/1998 |
| CN | 1247576 | 3/2000 |
| CN | 100528418 | 8/2009 |
| CN | 10157474 | 11/2009 |
| CN | 101574741 | 11/2009 |
| JP | 2002-29853 A | 1/2002 |
| JP | 2002-206105 | 7/2002 |
| JP | 2006-188765 | 7/2006 |
| JP | 2009-510260 A | 3/2009 |
| WO | WO 2010/148627 | 12/2010 |

OTHER PUBLICATIONS

Office Action issued in related Japanese Patent Application No. 2016-570847 dated Dec. 19, 2018, 11 pages.
Examination Report under Section 18(3) GB Application No. 1615614.3 dated Jul. 13, 2017.
Chinese Office Action dated Apr. 5, 2017 for Appln. No. 201480073270.3.
Office Action that issued in related Japanese Patent Application No. 2016-570847 dated Aug. 21, 2018, 10 pages.
International Search Report dated Feb. 17, 2015 for Appln. No. PCT/CN2014/090151.

* cited by examiner

*Primary Examiner* — Jie Yang
(74) *Attorney, Agent, or Firm* — Pillsbury Winthrop Shaw Pitman LLp

(57) ABSTRACT

The invention relates to the rare metal smelting field, and particularly, the present invention relates to a tantalum powder for preparing capacitors and a process for preparing the tantalum powder, and to a sintered anode prepared from the tantalum powder. As to the tantalum powder as provided by the invention, its primary tantalum powder has a BET of from 3.0 to 4.5 m²/g. After the secondary agglomeration, the tantalum powder has a large particle size. The tantalum powder has an average Fisher sub-sieve size (FSSS) of 1.2 to 3.0 μm wherein as measured with a standard sieve mesh, more than 75% of tantalum powder has a +325-mesh, and a particle size distribution D50 of more than 60 μm, that is, the secondary particle size is high. A resultant capacitor anode prepared by sintering the tantalum powder of the invention at 1200° C. for 20 minutes and then being energized at the voltage of 20 V has the specific capacitance of from 140,000 to 180,000 μFV/g and the residual current of less than 1.0 nA/μFV. Meantime, the invention provides an economical process for making the tantalum powder.

10 Claims, No Drawings

TANTALUM POWDER AND PROCESS FOR PREPARING THE SAME, AND SINTERED ANODE PREPARED FROM THE TANTALUM POWDER

CROSS-REFERENCE TO RELATED APPLICATIONS

This is the U.S. National Stage of PCT/CN2014/090151, filed Nov. 3, 2014, the entire contents of which is incorporated herein by reference in its entirety.

FIELD OF THE INVENTION

The invention relates to the rare metal smelting field, and particularly, the present invention relates to a tantalum powder for preparing capacitors and a process for preparing the tantalum powder, and to a sintered anode prepared from the tantalum powder.

BACKGROUND OF THE INVENTION

Tantalum powder is primarily used for preparing tantalum capacitors, and according to requirements in the miniaturization of electronic devices and electronic circuits and for dealing with competitions of multilayer ceramic capacitors (MLCC) and aluminum capacitors to tantalum capacitors in conventional applications, there is a need for a tantalum powder having a higher specific capacitance, a better pressure resistance and a better sintering resistance on the market. Commercial tantalum powder has a specific capacitance ranging from 8,000 to 200,000 μFV/g and a maximum consumption is directed to the tantalum powder of from 30,000 to 100,000 μFV/g, and tantalum powder having the specific capacitance of 120,000 to 200,000 μFV/g is still consumed in a less amount. There are some documents to report tantalum powder having a specific capacitance of greater than 200,000 μFV/g, while it is not applied commercially. In order to increase the pressure resistance and sintering resistance of a tantalum powder, general operations include increasing sintering temperature, prolonging sintering time, and increasing energization voltage, while increasing sintering temperature and prolong sintering time will result in the loss in the specific capacitance, and increasing the energization voltage will increase the residual current.

A commonly-used method for producing tantalum powder is to reduce potassium fluorotantalate ($K_2TaF_7$) with sodium. Particle size or specific surface area of tantalum powder is controlled by adding a diluent salt, e.g., KCl, NaCl, and KF. When the proportion of the diluent salt is increased, resultant tantalum powder will become fine, that is, to increase the surface area of the resultant tantalum powder. However, the production ability of tantalum powder will be accordingly lowered with the increase in the proportion of the diluent salt. It is economic to prepare capacitor powder having a specific capacitance of from 18,000 to 70,000 μFV/g by using sodium reduction of potassium fluorotantalate ($K_2TaF_7$) in industry. If capacitors having a high specific capacitance is required to be prepared, tantalum powder having a lower primary fineness is in need, and thus potassium fluorotantalate ($K_2TaF_7$) should be reduced with sodium at the condition of diluent salts (e.g., KCl, NaCl, and KF) in a higher proportion.

Currently, tantalum powder is primarily produced by sodium reduction of potassium fluorotantalate and magnesium reduction of tantalum oxide. The sodium reduction of potassium fluorotantalate is a conventional production process for tantalum powder, and the process has the advantages of a well-developed process and a high market share; the magnesium reduction of tantalum oxide is a novel production process, and tantalum powder produced by the method shares a certain proportion on the market. Some other production processes for tantalum powder are also reported, for example, a process of reacting $TaCl_5$ with alkali metals, and alkali earth metals, and a process for reducing tantalum oxide with rare earth metals and/or hydrides of rare metals. However, tantalum powder produced by these processes are not commercially available.

Chinses patent ZL98802473.X (also published as U.S. Pat. No. 6,193,779) discloses a tantalum powder free of alkali and fluorine having a primary particle size of 50 to 300 nm, and a secondary particle size of more than 10 μm according to D-50 value (ASTM-B-288), which is sintered at 1100 to 1300° C. for 10 minutes and then energized with the voltage of 16V to give a capacitor having a specific capacitance of 120,000 to 180,000 μFV/g, and a residual current of 2 nA/μFV. Meantime, the patent discloses a process for preparing the tantalum powder by reacting $TaCl_5$ with alkali metals, alkali earth metals in an inert atmosphere.

Chinese patent ZL98802572.8 (also published as U.S. Pat. No. 6,238,456) discloses a tantalum powder free of alkali and fluorine having a primary particle size of 150 to 300 nm, and a secondary particle size of more than 5 μm, which is sintered at 1200° C. for 10 minutes and then energized with the voltage of 16V to give a capacitor having a specific capacitance of 80,000 to 120,000 μFV/g, and a residual current of 5 nA/μFV. Meantime, the patent discloses a process for preparing the tantalum powder by reducing potassium fluorotantalate with metal sodium.

Japanese patent JP4828016 (also published as PCT/JP01/06768, WO 02/11932) discloses a process of producing tantalum powder by using metal sodium to reduce potassium fluorotantalate, and the tantalum powder prepared by the patent process has a specific capacitance of 80,000 to 250,000 μFV/g.

International patent WO 2010/148627A1(PCT/CN2010/000414) discloses a method of preparing tantalum powder for a high capacitance capacitor with three-step reduction, wherein tantalum oxide is reduced with rare earth metals and/or hydrides of rare earth metals, and the method can prepare tantalum powder having a specific capacitance of 100,000 to 400,000 μFV/g.

The above patents have the following disadvantages, and thus the corresponding processes therein have certain limits during actual applications.

Tantalum powder as manufactured in Chinese patent ZL98802473.X (also published as U.S. Pat. No. 6,193,779) has low particle size, poor sintering resistance and low energization voltage.

Tantalum powder as manufactured in Chinese patent ZL98802572.8 (also published as U.S. Pat. No. 6,238,456) has a low specific capacitance, and a large residual current.

In the method of Japanese patent JP4828016 (also published as PCT/JP01/06768, WO02/11932), prior to the addition of sodium, the amount of diluent salts is greater than the amount of potassium fluorotantalate ($K_2TaF7$) by a factor of 40 to 1000, and thus the method is not economical. In addition, the patent only discloses the specific capacitance of the tantalum powder prepared in the process, while it does not disclose the residual current of the tantalum powder.

The process for producing tantalum powder in International patent WO 2010/148627A1 (PCT/CN2010/000414) has a high requirement to the quality of the raw material tantalum powder, and thus the performances of the resultant tantalum powder will depend on tantalum oxide. Furthermore, the process is more complex than the sodium reduction of potassium fluorotantalate.

SUMMARY OF THE INVENTION

In view of the above disadvantages, the aim of the invention is to provide a sintering resistant tantalum powder with high specific capacitance and high energization voltage (20V); another aim of the invention is to provide an economical process for producing the tantalum powder, in which the ratio of the amount of the diluent salts to that of potassium fluorotantalate is 4-10:1; further aim of the invention is to provide an improved tantalum powder so that the leakage current of sintered anodes prepared from the tantalum powder is lowered.

The invention further relates to a process for producing the above tantalum powder.

The invention provides a tantalum powder having an average Fisher sub-sieve size (FSSS) of 1.2 to 3.0 μm, preferably 1.5-2.0 μm, wherein as measured with a standard sieve mesh, more than 75% (preferably more than 80%) of tantalum powder has a particle size of +325-mesh, and with a process for producing the tantalum powder to achieve one or more of the above aims.

Preferably, the tantalum powder as provided in the invention has a size particle distribution D50 of more than 60 βm.

Preferably, the resultant capacitor anode prepared by sintering the tantalum powder of the invention at 1200° C. for 20 minutes and then being energized at the voltage of 20 V has the specific capacitance of from 140,000 to 180,000 μFV/g and the residual current of less than 1.0 nA/μFV.

In a preferred embodiment of the tantalum powder as provided in the invention, the tantalum powder has an oxygen content of 7,000 to 12,000 ppm, preferably from 9,000 to 11,000 ppm. In a certain embodiment, the tantalum powder has a nitrogen content of from 1500 to 2500 ppm, preferably from 2000 to 2200 ppm. In a further embodiment, the tantalum powder has a phosphorous content of from 110 to 180 ppm, preferably from 140 to 160 ppm.

In a more preferred embodiment, the tantalum powder has an alkali earth metal content of less than 15 ppm, preferably less than 12 ppm.

The invention further provides a process of producing tantalum powder, comprising the following steps:

1) providing a primary tantalum powder having a BET of from 3.0-4.5 m$^2$/g;

2) subjecting the primary tantalum powder obtained in the step 1) to the pre-agglomeration, and then feeding the pre-agglomerated tantalum powder into a vacuum heat treatment furnace to carry out 3- to 5-stage agglomerations;

3) subjecting the agglomerated tantalum powder to a deoxygenation and nitrogen-doping; and 4) washing and drying the deoxygenated and nitrogen-doped tantalum powder, to give the tantalum powder product.

Preferably, in the step 1), tantalum powder prepared by using metal sodium to reduce potassium fluorotantalate ($K_2TaF_7$) with a diluent salt of alkali metal halides is used as the primary tantalum powder. The diluent salt is usually added once, while the addition times are not restricted. More preferably, during the sodium reduction, a mixture of potassium fluorotantalate ($K_2TaF_7$) and potassium iodine (KI) is added in batches (i.e., added more than one times) to a reaction container containing melt salts of alkali metal halides. In each batch, after potassium fluorotantalate is added,the metal sodium in a corresponding stoichiometric ratio (here, the stoichiometric ratio of the metal sodium is calculated according to the amount of potassium fluorotantalate which is added just now), and the reduction is carried out at the temperature of from 800 to 860° C. in an argon atmosphere. After side products are separated from the reaction mixture, the primary tantalum powder is provided. Most preferably, the step 1) further comprises washing the primary tantalum powder with an aqueous solution of inorganic acids having a pH of 3-5, and then washing it with deionized water and drying.

Preferably, the alkali metal halides include potassium chloride (KCl), sodium chloride (NaCl), potassium fluoride (KF) or mixtures thereof; the inorganic acids include hydrochloric acid and/or sulfuric acid, preferably hydrochloric acid.

As well known in the art, the higher amount of the added potassium fluorotantalate will lead to a higher particle size of the resultant primary powder; the lower amount of the added potassium fluorotantalate will lead to a lower particle size of the resultant primary powder, Hence, in the step 1), the particle size of the primary tantalum powder may be adjusted by adjusting the amount of the potassium fluorotantalate added in each batch, and at the same time, the process in which potassium fluorotantalate and the metal sodium are added in batches may maintain the consumption of the diluent salt in an economical level. In the invention, the mass ratio of potassium fluorotantalate to alkali metal halides which are added accumulatively is controlled to be 1:(4 to 10), wherein the alkali metal halide refers to the alkali metal halide as the diluent salt, except for potassium iodine.

In the step 1), preferably, potassium fluorotantalate and potassium iodine are mixed in a mass ratio of (10 to 20): 1, while the grain refiner, potassium sulfate ($K_2SO_4$) and/or ammonium dihydric phosphate ($NH_4H_2PO_4$) are blended into. The operations can effectively avoid the condensation of primary particles which are produced just now in the reaction.

Preferably, in the step 2), the agglomeration is carried out at the temperature of from 800 to 1200° C., particularly from 900 to 1050° C.

In the step 2), during the pre-agglomeration, water is used as the adhesive. The applicant surprisingly finds out that the agglomeration of the invention can efficiently eliminate harmful super-fine tantalum powder. Here, the term "super-fine tantalum powder" refers to tantalum powder having a particle size of ≤0.05 μm.

For example, in the step 3), metal magnesium scraps or magnesium alloy scraps may be used for the deoxygenation of the agglomerated tantalum powder. Preferably, during the deoxygenation treatment, ammonium dihydric phosphate ($NH_4H_2PO_4$) is added so as to prevent excessive sintering among particles during the deoxygenation treatment, thereby to maintain the efficient surface of the tantalum powder particles. It should be understood that since the ammonium dihydric phosphate will be decomposed when heated, and what does act the above function is the element phosphorous. Hence, the amount of ammonium dihydrogen phosphate refers to the equivalent phosphorous amount, that is, the amount of the element phosphorous contained in the ammonium dihydric phosphate.

In the step 3), the nitrogen doping treatment may be carried out, such as, according the method as recited in Chinese patent ZL200810002930.5.

Preferably, after the completion of keeping the tantalum powder at a temperature, air is fed intermittently many times during cooling the tantalum powder to ambient temperature so as to effect a passivation treatment, for the reason that when air is fed, surfaces of the tantalum powder may be oxidized to release heat, and the intermittent feeding of air can control the released heat. In a preferred embodiment of the invention, a mixed aqueous solution of inorganic acids and hydrogen peroxide is used in the step 4) for washing the tantalum powder obtained in the step 3), so as to remove residual magnesium and the reaction byproduct of magnesium oxide. Preferably, the used inorganic acid is hydrochloric acid, nitric acid or a mixture of hydrochloric acid and nitric acid.

In another preferred embodiment of the invention, the tantalum powder obtained in the step 4) can be hydraulically separated to remove fine tantalum powder having a particle size of less than 5 μm therein. Preferably, the hydraulic separation is carried out by using water (preferably, deionized water) to rinse the tantalum powder or using a commercially available hydraulic separation device.

Preferably, fine tantalum powder should be separated as thoroughly as possible by the means of the hydraulic separation, so as to avoid impacts of too much fine tantalum powder residue in the tantalum powder product on the residual current of an anode prepared from the tantalum powder. Generally, deionized water may be used for rinsing the tantalum powder until that the electrical conductivity of the tantalum powder is <50 μs/cm.

The tantalum powder as provided in the invention is particularly suitable for the manufacture of an anode in an electrolytic capacitor having a specific capacitance of 140,000 to 180,000 μFV/g and a residual current of less than 1 nA/μFV. For example, the capacitor anode may be prepared by sintering the tantalum powder as provided in the invention at the temperature of 1200° C. for 20 minutes, and energizing the tantalum powder at a voltage of 20 V.

The beneficial effects of the invention are mainly embodied in the following aspect(s):

1. The sintering anode prepared from the tantalum powder of the invention has a high specific capacitance in combination of a low residual current;
2. The production process of the invention is well-developed, and has an improved mass ratio of the potassium fluorotantalate to alkali metal halides, and thus the production process is highly economical.

EMBODIMENT

In order to further illustrate the invention, the following examples are provided to make descriptions to the preferred embodiments of the invention, and the aims, characteristics and advantages of the invention can be obviously shown. However, these descriptions are only used for further illustrating the characteristics and advantages of the invention, but not for limitations to the invention. In the examples, when specific conditions are not specified, the examples are carried out according to conventional conditions or conditions proposed by manufacturers. All reagents or apparatus whose producers are not specified, they are conventional products which can be available on the market.

With the purpose of the description, it should be understood that all numbers in the claims and description which are used to express component amounts and reaction conditions should be modified with the wording "about", unless otherwise specified. Accordingly, all numerical parameters given in the following description and claims are approximate values, and they will vary with desired properties which the invention attempts to achieve, unless otherwise specified. At least and with no intentions, the doctrine of equivalents is, at least and with no intentions, not excluded to be applied to the scope of the claims, and each numerical parameter should be explained at least according to digit capacity of reported efficient numbers and usual round-up technique.

In the invention, when the mesh is used to represent the particle size of powder, the signs "+" and "−" respectively represent "passing" or "not-passing" through sieves having said meshes. For example, the "−60-mesh" represents passing through 60-mesh sieves, and the "+200-mesh" represent not-passing through 200-mesh sieves.

The analysis to impurity amounts in tantalum powder is made according to National Standard GB/T15076.1 to 15076.15, and the analysis to physical property is made according to Industry Standard YS/T573-2007. The measurements to the leakage current and capacitance of tantalum powder are carried out according to National Standard GB/T3137

EXAMPLE 1

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 850° C., the mixture is stirred and the temperature is kept for 30 minutes. Then, a mixture consisting of 5 kg of potassium fluorotantalate, 250 g of potassium iodine and 50 g of potassium sulfate is added to the above reaction mixture. When the reaction temperature is raised to 850° C. again, with the calculations according to the chemical reaction: $K_2TaF_7 + 5Na = Ta + 5NaF + 2KF$, the metal sodium in the stoichiometric ratio is added; following this, the above mixed raw material in the same fraction amount is further added, and after the temperature is raised to 850° C. again, the metal sodium in a corresponding stoichiometric ratio is added. The addition procedure is repeated for 9 times. After the reaction is completed, the reaction mixture is kept at the temperature of 830° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 3 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.05 m$^2$/g |
| Oxygen | 1.0% |
| Nitrogen | 315 ppm |
| Potassium | 32 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 5-stage agglomeration treatment, that is, the furnace is evacuated and the temperature is raised to 800 V and then the temperature is kept for 1 hour; further, the temperature is raised to 1000° C. and the temperature is kept for 1 hour; further, the temperature is raised to 1050° C. and the temperature is kept for 30 minutes; further, the temperature is raised to 1100° C. and the temperature is kept for 30 minutes; and further, the temperature is raised to 1180° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.0% based on the mass of the tantalum powder and ammonium dihydric phosphate (the equivalent phosphorous being 120 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.15 MPa. The temperature is controlled at 180° C.±5° C. and kept for 8 hours. After the temperature-keeping, the reactor is cooled to ambient temperature while air is fed intermittently several times to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual metal magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity of the solution is <50 µs/cm. Then, the tantalum powder is transferred to a filter tank, and it is washed with deionized water until the electrical conductivity is less than 5 µs/cm. Subsequently, the tantalum powder is filtered, dried and screened with a 80-mesh sieve to give the tantalum powder product.

EXAMPLE 2

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 µm are weighted and mixed, and then the resulting mixture is loaded into the reactor. Subsequently, the reactor is heated in a heating furnace, and after the temperature is raised to 850° C., the mixture is stirred and the temperature is kept for 30 minutes. Then, a mixture consisting of 5 kg of potassium fluorotantalate, 250 g of potassium iodine, 500 g of potassium sulfate ($K_2SO_4$) and 0.4 g of ammonium dihydric phosphate is added to the above reaction mixture. When the reaction temperature is raised to 850° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 850° C. again, the metal sodium in a corresponding stoichiometric ratio is added. The addition procedure is repeated for 9 times. After the reaction is completed, the reaction mixture is kept at the temperature of 830° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 3 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.20 m²/g |
| Oxygen | 1.05% |
| Nitrogen | 340 ppm |
| Potassium | 36 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 5-stage agglomeration treatment, that is, the furnace is evacuated and the temperature is raised to 800° C. and then the temperature is kept for 1 hour; further, the temperature is raised to 1000° C. and the temperature is kept for 1 hour; further, the temperature is raised to 1050° C. and the temperature is kept for 30 minutes; further, the temperature is raised to 1100° C. and the temperature is kept for 30 minutes; and further, the temperature is raised to 1180° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.0% based on the mass of the tantalum powder and ammonium dihydric phosphate (the equivalent phosphorous being 80 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.15 MPa. The temperature is controlled at 180° C.±5° C. and kept for 8 hours. After the temperature-keeping, the reactor is cooled to ambient temperature while air is fed repeatedly to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity of the solution is <50 μs/cm. Then, the tantalum powder is transferred to a filter tank, and it is washed with deionized water until the electrical conductivity is less than 5 μs/cm. Subsequently, the tantalum powder is filtered, dried and passes through a 80-mesh sieve to give the tantalum powder product.

EXAMPLE 3

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 830° C. , the mixture is stirred and kept at the temperature for 30 minutes. Then, a mixture consisting of 5 kg of potassium fluorotantalate, 350 g of potassium iodine and 50 g of potassium sulfate ($K_2SO_4$) is added to the above reaction mixture. When the reaction temperature is raised to 830° C. again, with the calculations according to the chemical reaction: $K_2TaF_7 + 5Na = Ta + 5NaF + 2KF$, the metal sodium in the stoichiometric ratio is added; following this, the above mixed raw material in the same fraction amount is further added, and after the temperature is raised to 830° C. again, the metal sodium in a corresponding stoichiometric ratio is added. The addition procedure is repeated for 9 times. After the reaction is completed, the reaction mixture is kept at the temperature of 820° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 3 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.50 m$^2$/g |
| Oxygen | 1.15% |
| Nitrogen | 380 ppm |
| Potassium | 39 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 5-stage agglomeration treatment, that is, the furnace is evacuated and the temperature is raised to 800° C. and then the temperature is kept for 1 hour; further, the temperature is raised to 1000° C. and the temperature is kept for 1 hour; further, the temperature is raised to 1050° C. and the temperature is kept for 30 minutes; further, the temperature is raised to 1100° C. and the temperature is kept for 30 minutes; and further, the temperature is raised to 1180° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.5% based on the mass of the tantalum powder and ammonium dihydric phosphate (the equivalent phosphorous being 140 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.18 MPa. The temperature is controlled at 180° C.±5° C. and kept for 8 hours. After the temperature-keeping, the reactor is cooled to ambient temperature while air is fed repeatedly to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the, electrical conductivity of the solution is <50 μs/cm. Then, the tantalum powder is transferred to a filter tank, and it is washed with deionized water until the electrical conductivity is less than 5 μs/cm. Subsequently, the tantalum powder is filtered, dried and screened with a 80-mesh sieve to give the tantalum powder product.

EXAMPLE 4

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of 0.5 μm are weighted and mixed, and then the resulting mixture is loaded into the reactor. Subsequently, the reactor is heated in a heating furnace, and after the temperature is raised to 830° C., the mixture is stirred and the temperature is kept for 30 minutes. Then, a mixture consisting of 5 kg of potassium fluorotantalate, 250 g of potassium iodine, 50 g of potassium sulfate ($K_2SO_4$) and 0.5 g of ammonium dihydric phosphate is added to the above reaction mixture. When the reaction temperature is raised to 830° C. again, with the calculations according to the chemical reaction: $K_2TaF_7 + 5Na = Ta + 5NaF + 2KF$, the metal sodium in the stoichiometric ratio is added; following this, the above mixed raw material in the same fraction amount is further added, and after the temperature is raised to 830° C. again, the metal sodium in a corresponding stoichiometric ratio is added. The addition procedure is repeated for 9 times. After the reaction is completed, the reaction mixture is kept at the temperature of 820° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 4 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.66 m$^2$/g |
| Oxygen | 1.18% |
| Nitrogen | 420 ppm |
| Potassium | 41 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 5-stage agglomeration treatment, that is, the furnace is evacuated and the temperature is raised to 800° C. and then the temperature is kept for 1 hour; further, the temperature is raised to 1000° C. and the temperature is kept for 1 hour; further, the temperature is raised to 1050° C. and the temperature is kept for 30 minutes; further, the temperature is raised to 1100° C. and the temperature is kept for 30 minutes; and further, the temperature is raised to 1180° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.5% based on the mass of the tantalum powder and ammonium dihydric phosphate (the equivalent phosphorous being 100 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.18 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity of the solution is <50 μs/cm. Then, the tantalum powder is transferred to a filter tank, and it is washed with deionized water until the electrical conductivity is less than 5 μs/cm. Subsequently, the tantalum powder is filtered, dried and screened with a 80-mesh sieve to give the tantalum powder product.

EXAMPLE 5

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 830° C., the mixture is stirred and the temperature is kept for 30 minutes. Then, a mixture consisting of 3 kg of potassium fluorotantalate, 250 g of potassium iodine and 50 g of potassium sulfate ($K_2SO_4$) is added to the above reaction mixture. When the reaction temperature is raised to 830° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 830° C. again, the metal sodium in a corresponding stoichiometric ratio is added. The addition procedure is repeated for 11 times. After the reaction is completed, the reaction mixture is kept at the temperature of 820° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 4 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.85 m$^2$/g |
| Oxygen | 1.27% |
| Nitrogen | 400 ppm |
| Potassium | 42 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 4-stage agglomeration treatment, that is, the furnace is evacuated and the temperature is raised to 800° C. and then the temperature is kept for 1 hour; further, the temperature is raised to 1000° C. and the temperature is kept for 1 hour; further, the temperature is raised to 1050° C. and the temperature is kept for 30 minutes; and further, the temperature is raised to 1120° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.8% based on the mass of the tantalum powder and ammonium dihydric phosphate (the equivalent phosphorous being 150 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.18 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity is <50 μs/cm. Then, the tantalum powder is transferred to a filter tank, and it is washed with deionized water until the electrical conductivity is less than 5 ps/cm. Subsequently, the tantalum powder is filtered, dried and screened with a 80-mesh sieve to give the tantalum powder product.

EXAMPLE 6

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 830° C. , the mixture is stirred and kept at the temperature for 30 minutes. Then, a mixture consisting of 3 kg of potassium fluorotantalate, 250 g of potassium iodine, 50 g of potassium sulfate and 0.5 g of ammonium dihydric phosphate is added to the above reaction mixture. When the reaction temperature is raised to 830° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 850° C. again, the metal sodium in a corresponding stoichiometric ratio is added. The addition procedure is repeated for 11 times. After the reaction is completed, the reaction mixture is kept at the temperature of 820° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 4 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 4.02 m²/g |
| Oxygen | 1.32% |
| Nitrogen | 420 ppm |
| Potassium | 39 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 4-stage agglomeration treatment, that is, the furnace is evacuated and the temperature is raised to 800° C. and then the temperature is kept for 1 hour; further, the temperature is raised to 1000° C. and the temperature is kept for 1 hour; further, the temperature is raised to 1050° C. and the temperature is kept for 30 minutes; and further, the temperature is raised to 1120° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.8% based on the mass of the tantalum powder and ammonium dihydric phosphate (the equivalent phosphorous being 120 ppm based on the mass of the tantalum powder) are added, and they are mixed uniformly. Then the mixture is placed in a crucible with a cover, Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.18 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity is <50 μs/cm. Then, the tantalum powder is transferred to a filter tank, and it is washed with deionized water until the electrical conductivity is less than 5 μs/cm. Subsequently, the tantalum powder is filtered, dried and screened with a 80-mesh sieve to give the tantalum powder product.

EXAMPLE 7

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 800° C., the mixture is stirred and kept at the temperature for 30 minutes. Then, a mixture consisting of 2.5 kg of potassium fluorotantalate, 250 g of potassium iodine and 50 g of potassium sulfate ($K_2SO_4$) is added to the above reaction mixture. When the reaction temperature is raised to 800° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 800° C. again, the metal sodium in a corresponding stoichiometric ratio is added. The addition procedure is repeated for 9 times. After the reaction is completed, the reaction mixture is kept the temperature of 800° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 5 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 4.32 $m^2/g$ |
| Oxygen | 1.35% |
| Nitrogen | 450 ppm |
| Potassium | 40 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 4-stage agglomeration treatment, that is, the furnace is evacuated and the temperature is raised to 800° C. and then the temperature is kept for 1 hour; further, the temperature is raised to 1000° C. and the temperature is kept for 1 hour; further, the temperature is raised to 1050° C. and the temperature is kept for 30 minutes; and further, the temperature is raised to 1100° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.8% based on the mass of the tantalum powder and ammonium dihydric phosphate (the equivalent phosphorous being 180 ppm based on the mass of the tantalum powder) are added, and they are mixed uniformly. Then the mixture is placed in a crucible with a cover. Following this, the crucible is placed in an argon-protective reactor, and after the temperature reaches 820° C., the temperature is kept for 2 hours. The reactor is cooled to 150° C., and after the temperature is constant, nitrogen gas is fed thereto so that the pressure in the reactor reaches 0.18 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity is <50 μs/cm. Then, the tantalum powder is transferred to a filter tank, and it is washed with deionized water until the electrical conductivity is less than 5 μs/cm. Subsequently, the tantalum powder is filtered, dried and screened with a 80-mesh sieve to give the tantalum powder product.

EXAMPLE 8

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 800° C., the mixture is stirred and the temperature is kept for 30 minutes. Then, a mixture consisting of 2.5 kg of potassium fluorotantalate, 250 g of potassium iodine, 50 g of potassium sulfate ($K_2SO_4$), and 0.5 g of ammonium dihydric phosphate is added to the above reaction mixture. When the reaction temperature is raised to 800° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 800° C. again, the metal sodium in a corresponding stoichiometric ratio is added. The addition procedure is repeated for 9 times. After the reaction is completed, the reaction mixture is kept at the temperature of 800° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 5 is used to wash and purify resultant the primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 4.48 $m^2/g$ |
| Oxygen | 1.37% |
| Nitrogen | 470 ppm |
| Potassium | 45 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 4-stage agglomeration treatment, that is, the furnace is evacuated and the temperature is raised to 800 V and then the temperature is kept for 1 hour; further, the temperature is raised to 1000° C. and the temperature is kept for 1 hour; further, the temperature is raised to 1050° C. and the temperature is kept for 30 minutes; and further, the temperature is raised to 1100 V and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.5% based on the mass of the tantalum powder and ammonium dihydric phosphate (the equivalent phosphorous being 140 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.18 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity is <50 has/cm. Then, the tantalum powder is transferred to a filter tank, and it is washed with deionized water until the electrical conductivity is less than 5 μs/cm. Subsequently, the tantalum powder is filtered, dried and screened with a 80-mesh sieve to give the tantalum powder product.

EXAMPLE 9

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≤0.5 μm are weighted and mixed, and then the resulting mixture is loaded into the reactor. Subsequently, the reactor is heated in a heating furnace, and after the temperature is raised to 850° C., the mixture is stirred and kept at the temperature for 30 minutes. Then, a mixture consisting of 5 kg of potassium fluorotantalate, 250 g of potassium iodine and 500 g of potassium sulfate ($K_2SO_4$) is added to the above reaction mixture. When the reaction temperature is raised to 830° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 850° C. again, the metal sodium in a corresponding stoichiometric ratio is added. The addition procedure is repeated for 9 times. After the reaction is completed, the reaction mixture is kept at the temperature of 830° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 3 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.02 $m^2/g$ |
| Oxygen | 1.05% |
| Nitrogen | 310 ppm |
| Potassium | 30 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 3-stage agglomeration treatment, that is, the furnace is evacuated and the temperature is raised to 800° C. and then the temperature is kept for 1 hour; further, the temperature is raised to 1050° C. and the temperature is kept for 30 minutes; and further, the temperature is raised to 1180° C. and the temperature is kept for 20 minutes. After the agglomeration is completed, the tantalum powder is cooled to ambient temperature. Then, the tantalum powder is taken out of the reactor, and it is crushed and screened with a 60-mesh sieve.

Step 3)

To the tantalum powder obtained in the step 2), magnesium scraps in an amount of 3.0% based on the mass of the tantalum powder and ammonium dihydric phosphate (the equivalent phosphorous being 120 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.15 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity of the solution is <50 μs/cm. Then, the tantalum powder is transferred to a filter tank, and it is washed with deionized water until the electrical conductivity is less than 5 μs/cm. Subsequently, the tantalum powder is filtered, dried and passes through a 80-mesh sieve to give the tantalum powder product.

EXAMPLE 10

Step 1)

A reactor is evacuated and then Ar is fed to replace air therein. Following this, 100 kg of potassium chloride (KCl), 100 kg of potassium fluoride (KF) and 1 kg of fine tantalum powder having a FSSS particle size of ≥0.5 μm are weighted and mixed, and then the resulting mixture is loaded into the reactor. Subsequently, the reactor is heated in a heating furnace, and after the temperature is raised to 850° C., the mixture is stirred and the temperature is kept for 30 minutes. Then, a mixture consisting of 5 kg of potassium fluorotantalate, 250 g of potassium iodine, 500 g of potassium sulfate ($K_2SO_4$), and 0.4 g of ammonium dihydric phosphate is added to the above reaction mixture. When the reaction temperature is raised to 850° C. again, with the calculations according to the chemical reaction: $K_2TaF_7+5Na=Ta+5NaF+2KF$, the metal sodium in the stoichiometric ratio is added; following this, the above mixed raw material in the same fraction amount is further added, and after the temperature is raised to 850° C. again, the metal sodium in a corresponding stoichiometric ratio is added. The addition procedure is repeated for 9 times. After the reaction is completed, the reaction mixture is kept at the temperature of 830° C. for 10 minutes, and then the stirring is stopped and the reaction mixture is cooled to ambient temperature.

The reaction product is taken out from the reaction mixture and reaction byproducts are separated. A hydrochloric acid aqueous solution having a pH value of 3 is used to wash and purify the resultant primary tantalum powder and then the primary tantalum powder is washed with deionized water and dried.

The analytical data of the primary tantalum powder is shown as follows:

| | |
|---|---|
| Specific surface area (BET, nitrogen gas adsorption): | 3.24 m²/g |
| Oxygen | 1.12% |
| Nitrogen | 350 ppm |
| Potassium | 35 ppm |
| Sodium | <2 ppm |
| Calcium | <1 ppm |
| Magnesium | <1 ppm |

Step 2)

The primary tantalum powder obtained in the step 1) is subjected to the pre-agglomeration treatment by using deionized water as the adhesive. The pre-agglomerated tantalum powder is loaded in a crucible, and then the loaded crucible is placed in vacuum heat treating furnace to carry out the 3-stage agglomeration treatment, that is, the furnace is evacuated and the temperature is raised to 800° C. and then the temperature is kept for 1 hour; further, the temperature is raised to 1050° C. and the temperature is kept for 30 minutes; and further, the temperature is raised to 1180° C. and the temperature is kept for 20 minutes. After the agglomeration is completed, the tantalum powder is cooled to ambient temperature. Then, the tantalum powder is taken out of the reactor, and it is crushed and passes through a 60-mesh sieve.

Step 3)

To the tantalum powder obtained in the step 2), magnesium scraps in an amount of 3.0% based on the mass of the tantalum powder and ammonium dihydric phosphate (the equivalent phosphorous being 80 ppm based on the mass of the tantalum powder) are added, and they are mixed uniformly. Then the mixture is placed in a crucible with a cover. Following this, the crucible is placed in an argon-protective reactor, and after the temperature reaches 840° C., the temperature is kept for 2 hours. The reactor is cooled to 180° C., and after the temperature is constant, nitrogen gas is fed thereto so that the pressure in the reactor reaches 0.15 MPa. The temperature is controlled at 180° C.±5° C. and kept for 8 hours. After the temperature-keeping, the reactor is cooled to ambient temperature while air is fed intermittently to carry out a passivation treatment, and then, the resultant tantalum powder is taken out.

Step 4)

To the tantalum powder obtained in the step 3), a mixed aqueous solution of 10% nitric acid and 0.5% hydrogen peroxide is added to wash the tantalum powder for 2 hours while stirring, so that the residual magnesium and the reaction byproduct of magnesium oxide are removed. Then, the acid solution is decanted to be removed, and subsequently, deionized water is added thereto. After the solution is stirred for 1 minute, it is left still for 5 minutes, and then the supernatant aqueous solution containing fine tantalum powder is removed. The operation is repeated until the electrical conductivity is <50 μs/cm. Then, the tantalum powder is transferred to a filter tank, and it is washed with deionized water until the electrical conductivity is less than 5 μs/cm. Subsequently, the tantalum powder is filtered, dried and screened with a 80-mesh sieve to give the tantalum powder product.

By making measurements to the finished tantalum powder obtained in Examples 1-10, the measured chemical impurities therein are shown in Table 1, and the corresponding physical properties are as shown in Table 2.

The finished tantalum powder obtained in Examples 1-10 are compacted, sintered, and energized to give a sintered anode, and the specific capacitance and residual current of the sintered anode are measured. The conditions for preparing the anode and the measured electrical properties are shown in Table 3.

TABLE 1

Chemical Impurities of Finished Tantalum Powder

| | Chemical impurities (ppm) | | | | | | |
|---|---|---|---|---|---|---|---|
| Sample | O | N | P | K | Na | Ca | Mg |
| Example 1 | 7500 | 2000 | 110 | 30 | 3 | <5 | 7 |
| Example 2 | 7880 | 2060 | 112 | 31 | 3 | <5 | 8 |
| Example 3 | 9200 | 2220 | 132 | 32 | 3 | <5 | 8 |
| Example 4 | 9400 | 2250 | 140 | 33 | 3 | <1 | 9 |
| Example 5 | 10540 | 2400 | 136 | 36 | 3 | <5 | 8 |
| Example 6 | 10620 | 2450 | 142 | 36 | 3 | <5 | 7 |
| Example 7 | 11200 | 2450 | 160 | 38 | 3 | <5 | 9 |
| Example 8 | 11600 | 2480 | 160 | 40 | 4 | <5 | 8 |
| Example 9 | 7600 | 2100 | 110 | 30 | 3 | <5 | 8 |
| Example 10 | 7980 | 2080 | 112 | 32 | 3 | <5 | 8 |

TABLE 2

Physical Properties of Finished Tantalum Powder

| Sample | FSSS (μm) | Fluidity (s/50 g) | Sieve analysis +325 mesh | Sieve analysis −325 mesh | Particle size distribution D10 (μm) | D50 (μm) | D90 (μm) |
|---|---|---|---|---|---|---|---|
| Example 1 | 2.47 | 10.5 | 84.40 | 15.60 | 21.7 | 92.3 | 173.5 |
| Example 2 | 2.06 | 12.4 | 81.30 | 18.70 | 25.2 | 85.8 | 155.0 |
| Example 3 | 1.90 | 10.0 | 83.80 | 16.20 | 29.1 | 88.0 | 150.5 |
| Example 4 | 1.82 | 11.8 | 81.68 | 18.32 | 23.3 | 85.1 | 149.7 |
| Example 5 | 1.62 | 12.4 | 80.20 | 19.80 | 16.4 | 78.0 | 146.0 |
| Example 6 | 1.56 | 13.1 | 79.60 | 20.40 | 13.2 | 76.0 | 142.5 |
| Example 7 | 1.38 | 14.5 | 78.42 | 21.58 | 11.47 | 68.0 | 136.0 |
| Example 8 | 1.32 | 18.1 | 75.98 | 24.02 | 11.92 | 62.2 | 116.6 |
| Example 9 | 2.36 | 10.8 | 83.20 | 16.80 | 20.2 | 93.6 | 176.4 |
| Example 10 | 2.04 | 12.2 | 82.40 | 17.60 | 22.4 | 87.5 | 165.0 |

The particle size distribution is measured by a Kurt laser particle size distribution device LS230.

TABLE 3

Data of Electrical Properties of Finished Tantalum Powder

| Sample | Compacted destity (g/cm³) | Anode mass (g) | Sintering temperature (° C.) | Sintering time (min) | Energization voltage (V) | Specific capacitance (μFV/g) | Residual current (nA/μFV) |
|---|---|---|---|---|---|---|---|
| Example 1 | 5.0 | 0.1 | 1200 | 20 | 20 | 140100 | 0.13 |
| Example 2 | 5.0 | 0.1 | 1200 | 20 | 20 | 142000 | 0.14 |
| Example 3 | 5.0 | 0.1 | 1200 | 20 | 20 | 152200 | 0.20 |
| Example 4 | 5.0 | 0.1 | 1200 | 20 | 20 | 155400 | 0.25 |
| Example 5 | 5.0 | 0.1 | 1200 | 20 | 20 | 161000 | 0.45 |
| Example 6 | 5.0 | 0.1 | 1200 | 20 | 20 | 166500 | 0.48 |
| Example 7 | 5.0 | 0.1 | 1200 | 20 | 20 | 175000 | 0.84 |
| Example 8 | 5.0 | 0.1 | 1200 | 20 | 20 | 179800 | 0.86 |
| Example 9 | 5.0 | 0.1 | 1200 | 20 | 20 | 146200 | 0.44 |
| Example 10 | 5.0 | 0.1 | 1200 | 20 | 20 | 149200 | 0.46 |

The invention claimed is:

1. A tantalum powder having an average Fisher sub-sieve size (FSSS) of 1.2 to 3.0 μm, wherein as measured with a standard sieve mesh, more than 75% of tantalum powder has a particle size of +325-mesh, wherein the tantalum powder does not contain super-fine tantalum powder having a particle size of ≤0.05 μm, and wherein a resultant capacitor anode prepared by sintering the tantalum powder at 1200° C. for 20 minutes and then being energized at a voltage of 20 V has a specific capacitance of from 140,000 to 180,000 μFV/g, and a residual current of less than 1.0 nA/μFV.

2. The tantalum powder according to claim 1, having a D50 value of more than 60 μm.

3. The tantalum powder according to claim 1, having: an oxygen content of 7,000 to 12,000 ppm, optionally, a nitrogen content of from 1500 to 2500 ppm,
optionally, a phosphorous content of from 110 to 180 ppm, and/or
optionally, an alkali earth metal content of less than 15 ppm.

4. The tantalum powder according to claim 1, wherein the tantalum powder is an agglomerated tantalum powder, and the primary tantalum powder has a BET of from 3.0 to 4.5 m²/g.

5. A process for making the tantalum powder according to claim 1, comprising:
1) providing a primary tantalum powder having a BET of from 3.0-4.5 m²/g, wherein the primary tantalum powder is prepared by reducing potassium fluorotantalate ($K_2TaF_7$) with sodium in alkali metal halides, and optionally, inorganic acid is used to wash the primary tantalum powder and the washed tantalum powder is dried;

2) subjecting the primary tantalum powder obtained in 1) to the pre-agglomeration treatment, and then feeding the above pre-agglomerated tantalum powder into a vacuum heat treatment furnace to carry out 3- to 5-stage agglomerations;

3) subjecting the agglomerated tantalum powder to a deoxygenation and nitrogen-doping treatment, wherein metal magnesium scraps or alloy magnesium scraps is used for the deoxygenation of the agglomerated tantalum powder, and during the deoxygenation treatment, ammonium dihydric phosphate ($NH_4H_2PO_4$) with a phosphorous equivalent amount of from 50 to 150 ppm, based on the mass of the tantalum powder, is optionally added; and 4) washing and drying the deoxygenated and nitrogen-doped tantalum powder, to give the tantalum powder product.

6. The process according to claim 5, wherein in 1), a mixture of potassium fluorotantalate ($K_2TaF_7$) and potassium iodine (KI) is added in batches to a reaction container loaded with melt salts of alkali metal halides.

7. The process according to claim 5, wherein potassium fluorotantalate and potassium iodine are mixed in a mass ratio of (10 to 20): 1, while the grain refiners, potassium sulfate ($K_2SO_4$) and/or ammonium dihydric phosphate ($NH_4H_2PO_4$) are blended therein.

8. The process according to claim 5, wherein in 4), a mixed aqueous solution of an inorganic acid and hydrogen peroxide is used to wash the tantalum powder obtained in 3), and then the tantalum powder is subjected to a hydraulic separation to remove fine tantalum powder.

9. The process according to claim 8, wherein deionized water is used to carry out the hydraulic separation until the electrical conductivity is <50 μs/cm.

10. An anode prepared by sintering the tantalum powder according to claim 1, and a capacitor comprising the anode.

* * * * *